(12) United States Patent
Degani

(10) Patent No.: US 10,380,047 B2
(45) Date of Patent: Aug. 13, 2019

(54) TRAFFIC-DEPENDENT ADAPTIVE INTERRUPT MODERATION

(71) Applicant: Mellanox Technologies Ltd., Yokneam (IL)

(72) Inventor: Yuval Degani, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 643 days.

(21) Appl. No.: 14/664,988

(22) Filed: Mar. 23, 2015

(65) Prior Publication Data

US 2015/0286594 A1 Oct. 8, 2015

Related U.S. Application Data

(60) Provisional application No. 61/975,949, filed on Apr. 7, 2014.

(51) Int. Cl.
*G06F 13/24* (2006.01)
*G06F 13/42* (2006.01)
*H04L 29/06* (2006.01)

(52) U.S. Cl.
CPC .......... *G06F 13/24* (2013.01); *G06F 13/4234* (2013.01); *H04L 69/165* (2013.01)

(58) Field of Classification Search
CPC ..... G06F 13/24; G06F 13/4234; H04L 69/165
USPC ........................................................ 710/261
See application file for complete search history.

(56) References Cited

U.S. PATENT DOCUMENTS

| 7,209,994 | B1 | 4/2007 | Klaiber et al. |
| 7,222,203 | B2 | 5/2007 | Madukkarumukumana et al. |
| 7,302,511 | B2 | 11/2007 | Jeyasingh et al. |
| 8,180,944 | B2 | 5/2012 | Serebrin et al. |
| 8,566,494 | B2 | 10/2013 | Li et al. |
| 8,886,862 | B2 | 11/2014 | Kagan |
| 8,949,498 | B2 | 2/2015 | Kagan |
| 2006/0182039 | A1* | 8/2006 | Jourdain ............. H04L 47/10 370/252 |
| 2008/0294825 | A1 | 11/2008 | Mahalingam et al. |
| 2010/0023666 | A1 | 1/2010 | Mansell et al. |
| 2010/0070677 | A1 | 3/2010 | Thakkar |

(Continued)

OTHER PUBLICATIONS

Mellanox Technologies, "WinOF VPI for Windows", User Manual, 117 pages, Rev 4.40, Jul. 9, 2013.

(Continued)

*Primary Examiner* — Idriss N Alrobaye
*Assistant Examiner* — Brooke J Taylor
(74) *Attorney, Agent, or Firm* — Kligler & Associates

(57) ABSTRACT

A method for communications includes receiving in a network interface controller (NIC) of a host computer incoming data packets from a network on multiple active rings. An average throughput rate of the incoming data packets is measured over the active rings. For each ring among a plurality of the active rings, a respective throughput rate of the incoming data packets on the ring is measured, and a respective interrupt moderation parameter of the ring is set responsively to a comparison of the respective throughput rate on the ring to the average throughput rate. Interrupts are issued from the NIC to a central processing unit (CPU) of the host computer in response to the incoming data packets on the ring at a rate determined in accordance with the respective interrupt moderation parameter.

17 Claims, 2 Drawing Sheets

(56) References Cited

U.S. PATENT DOCUMENTS

| | | |
|---|---|---|
| 2010/0115514 A1 | 5/2010 | Maliszewski et al. |
| 2010/0174841 A1 | 7/2010 | Bogin et al. |
| 2010/0191885 A1 | 7/2010 | Serebrin et al. |
| 2010/0191887 A1 | 7/2010 | Serebrin et al. |
| 2010/0191888 A1 | 7/2010 | Serebrin et al. |
| 2010/0191889 A1 | 7/2010 | Serebrin et al. |
| 2010/0333101 A1 | 12/2010 | Pope et al. |
| 2011/0106993 A1 | 5/2011 | Arinobu et al. |
| 2011/0145459 A1* | 6/2011 | Conti ............... G06F 13/24 710/261 |
| 2011/0179417 A1 | 7/2011 | Inakoshi |
| 2012/0079175 A1* | 3/2012 | Flynn ............... G11C 7/1012 711/103 |
| 2012/0179742 A1* | 7/2012 | Acharya ............ H04N 7/18 709/202 |
| 2013/0067193 A1* | 3/2013 | Kagan ............... G06F 12/1081 711/206 |
| 2014/0006667 A1* | 1/2014 | Sun ................... G06F 13/24 710/261 |
| 2014/0040514 A1* | 2/2014 | Li .................... H04L 69/165 710/48 |

OTHER PUBLICATIONS

Melllanox Technologies, "Linux/drivers/net/ethernet/mellanox/mlx4/en_cq.c", version 4.1, 4 pages, year 2007.

Mellanox Technologies, "Linux/drivers/net/ethernet/mellanox/mlx4/en_netdev.c", version 4.1., 41 pages, year 2007.

Intel Corporation, "Linux/drivers/net/ethernet/intel/ixgbe/ixgbe_main.c", 92 pages, version 4.1., years 1999-2014.

Intel Corporation, "Intel® Xeon® Processor E5-2600 v31 Product Family", Product brief, 5 pages, Aug. 21, 2014.

\* cited by examiner

TRAFFIC-DEPENDENT ADAPTIVE INTERRUPT MODERATION

CROSS-REFERENCE TO RELATED APPLICATIONS

This application claims the benefit of U.S. Provisional Patent Application 61/975,949, filed Apr. 7, 2014, which is incorporated herein by reference.

FIELD OF THE INVENTION

The present invention relates generally to computer systems, and specifically to handling of interrupts generated by an input/output (I/O) device in a computer system.

BACKGROUND

In most computer systems today, the computer is connected to a packet network by a network interface controller (NIC). Upon receiving packets from the network, the NIC issues interrupts to the central processing unit (CPU) of the host computer, to inform the CPU that the packets have arrived and are awaiting service. In computers that handle a large volume of packet communication traffic, the resulting interrupts can place a significant burden on the CPU.

For this reason, many NICs use interrupt moderation in order to reduce the number of interrupts, and thus reduce the load they place on the CPU of the host computer to which they are attached. With interrupt moderation, the NIC hardware does not always generate an interrupt immediately after it receives a packet from the network. Rather, the hardware waits for more packets to arrive, or for a certain time-out to expire, before generating an interrupt. The NIC driver software generally allows the system operator to adjust the interrupt moderation parameters, such as the maximum number of packets and time-out interval between interrupts.

Some NICs offer adaptive interrupt moderation capabilities, which can adjust the interrupt rates dynamically depending on the traffic type and network usage. For example, U.S. Patent Application Publication 2014/0040514 describes a method for adaptive interrupt moderation in which a host device determines a number of connections between the host device and one or more link partners based, at least in part, on a connection identifier associated with each connection. The host device determines a new interrupt rate based at least in part on a number of connections, and updates an interrupt moderation timer with a value related to the new interrupt rate.

As another example, U.S. Patent Application Publication 2014/0006667 describes a method for adaptive hardware interrupt moderation in which the interrupt rate is adjusted based on traffic patterns. One mechanism used in this regard is to track and learn the traffic pattern in real time and dynamically tune various parameters through hardware. Dynamically-tuned parameters include a packet aggregation threshold and a push timer timeout value. Packet aggregation threshold techniques generally involve delaying interrupt generation until a predefined number of packets are received. Push timer timeout techniques generally involve forcing interrupt generation in low packet throughout scenarios if the received number of packets does not cross a threshold in a certain amount of time. One embodiment reduces packet delivery latency in the low packet rate case, while maximizing aggregation count in the high packet rate case.

U.S. Pat. No. 8,566,494 describes an apparatus that performs traffic class-based adaptive interrupt moderation. The apparatus comprises two or more interrupt vectors, and moderation timers associated with the interrupt vectors are set with different interrupt rates. An interrupt vector logic unit sends an interrupt vector if there is an interrupt event from a queue associated with a moderation timer and the moderation timer expires.

SUMMARY

Embodiments of the present invention that are described hereinbelow provide methods and software for adaptive interrupt moderation, as well as apparatus implementing such methods.

There is therefore provided, in accordance with an embodiment of the invention, a method for communications, which includes receiving in a network interface controller (NIC) of a host computer incoming data packets from a network on multiple active rings. An average throughput rate of the incoming data packets is measured over the active rings. For each ring among a plurality of the active rings, a respective throughput rate of the incoming data packets on the ring is measured, and a respective interrupt moderation parameter of the ring is set responsively to a comparison of the respective throughput rate on the ring to the average throughput rate. Interrupts are issued from the NIC to a central processing unit (CPU) of the host computer in response to the incoming data packets on the ring at a rate determined in accordance with the respective interrupt moderation parameter.

In a disclosed embodiment, the method includes identifying one or more idle rings on which the respective throughput rate is less than a predefined idle threshold, and setting the respective interrupt moderation parameter value for the one or more idle rings to a predefined idle value.

In some embodiments, setting the respective interrupt moderation parameter includes, when the respective throughput rate on the ring is less than a predefined fraction of the average throughput rate, setting the respective interrupt moderation parameter for the ring to a latency-mode value. Typically, setting the respective interrupt moderation parameter includes, when the respective throughput rate on the ring is greater than the predefined fraction of the average throughput rate, setting the respective interrupt moderation parameter for the ring to a throughput-mode value. In a disclosed embodiment, setting the respective interrupt moderation parameter for the ring to the latency mode value includes setting a minimum time between interrupts on the ring to zero, while setting the respective interrupt moderation parameter for the ring to the throughput-mode value includes setting the minimum time between interrupts to a non-zero value.

Additionally or alternatively, the predefined fraction may be a first fraction, and setting the respective interrupt moderation parameter includes, when the respective throughput rate on the ring is greater than the first fraction of the average throughput rate but less than a second fraction of the average throughput rate, setting the respective interrupt moderation parameter for the ring to a mid-range throughput value, and when the respective throughput rate on the ring is greater than the second fraction of the average throughput rate, setting the respective interrupt moderation parameter for the ring to a high-throughput value, which is different from the mid-range throughput value.

Further additionally or alternatively, setting the respective interrupt moderation parameter for the ring to the throughput-mode value may include counting a number of the rings for which the respective throughput rate on the ring is greater than the predefined fraction of the average throughput rate, and adjusting the throughput-mode value of the interrupt moderation parameter responsively to the number.

In some embodiments, the rings are associated with different, respective cores of the CPU, and setting the respective interrupt moderation parameter includes setting different, respective values of the interrupt moderation parameter for the cores, depending upon the rings with which the cores are respectively associated.

There is also provided, in accordance with an embodiment of the invention, apparatus for communications, which includes a central processing unit (CPU), a system memory, and a network interface controller (NIC). The NIC is configured to receive incoming data packets from a network on multiple active rings and to issue interrupts to the CPU in response to the incoming data packets at a rate determined, for each ring, in accordance with a respective interrupt moderation parameter that is set for the ring. The CPU is configured to measure an average throughput rate of the incoming data packets over the active rings and, for each ring among a plurality of the active rings, to measure a respective throughput rate of the incoming data packets on the ring, and to set the respective interrupt moderation parameter of the ring responsively to a comparison of the respective throughput rate on the ring to the average throughput rate.

There is additionally provided, in accordance with an embodiment of the invention, a computer software product, including a non-transitory computer-readable medium in which program instructions are stored, which instructions, when read by a computer that includes a CPU and a network interface controller (NIC), which is configured to receive incoming data packets from a network on multiple active rings and to issue interrupts to the CPU in response to the incoming data packets at a rate determined, for each ring, in accordance with a respective interrupt moderation parameter that is set for the ring, cause the computer to measure an average throughput rate of the incoming data packets over the active rings and, for each ring among a plurality of the active rings, to measure a respective throughput rate of the incoming data packets on the ring, and to set the respective interrupt moderation parameter of the ring responsively to a comparison of the respective throughput rate on the ring to the average throughput rate.

The present invention will be more fully understood from the following detailed description of the embodiments thereof, taken together with the drawings in which:

DETAILED DESCRIPTION OF EMBODIMENTS

Overview

Figure 1:
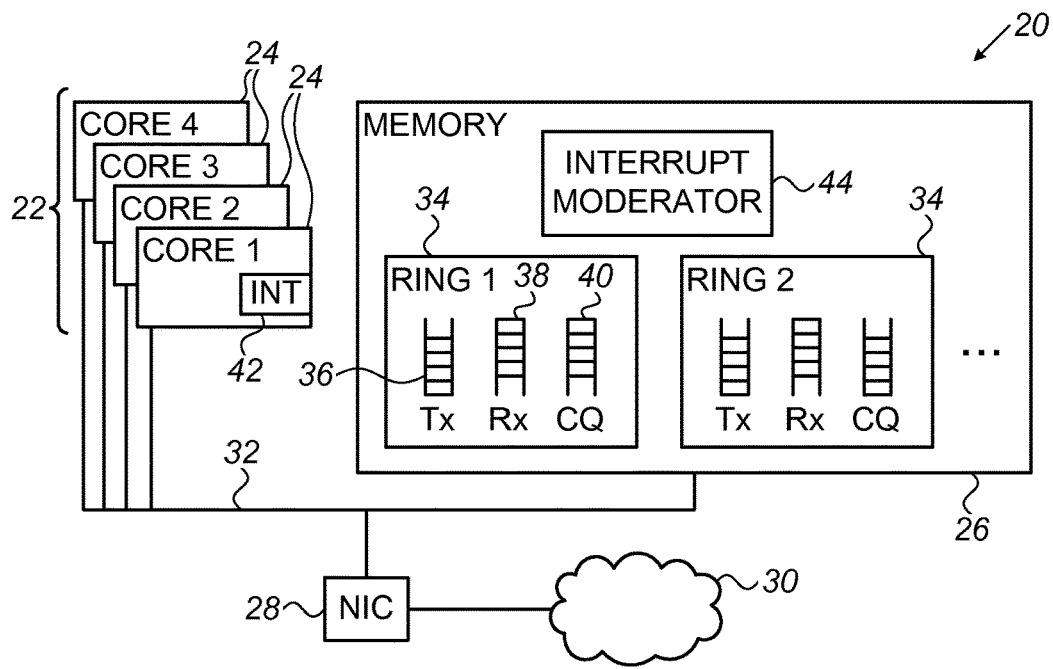
FIG. 1 is a block diagram that schematically illustrates a computer system, in accordance with an embodiment of the invention.

There is no single, optimal set of interrupt moderation parameters for balancing communication throughput and latency against CPU processing burden. Rather, different traffic patterns require different interrupt moderation values, and an adaptive algorithm should therefore identify traffic patterns and set interrupt moderation values accordingly. The inventor has discovered that for a NIC that handles heavy communication traffic on multiple transport channels, the optimal settings of interrupt moderation parameters for any given transport channel depend both on the individual characteristics of the transport channel itself and on the relation between the traffic on this transport channel and the traffic load on other channels and on the NIC as a whole.

Embodiments of the present invention that are described herein apply this principle in order to achieve maximum performance, in terms of highest throughput and lowest latency, with minimum CPU utilization. The disclosed embodiments compute and apply interrupt moderation parameters on a ring-by-ring basis, considering both the overall throughput rate of incoming traffic and the distribution and pattern of this traffic on each ring. The term "ring," in the context of the present description and in the claims, refers to a transport channel that is handled by a NIC (as described further hereinbelow with reference to FIG. 1), which issues interrupts to the CPU at a rate determined for each ring by the respective interrupt moderation parameters.

Specifically, in the disclosed embodiments, a NIC and the host computer to which it is connected identify traffic patterns based on some or all of the following parameters:
Number of active rings.
Packet rate (throughput).
Average packet size.
Current throughput on each receive ring as a fraction of the current link speed and/or throughput.
Categorization of receive rings:
  Idle
  Latency mode (low throughput)
  Mid-range throughput
  High throughput.

These embodiments provide a flexible technique for setting interrupt moderation parameters, such as the timeout period between interrupts and/or the packet count required to issue an interrupt. This technique covers a wide range of use cases and thus achieves near-optimal performance based on factory device settings, with little or no configuration and tuning required by the user.

The disclosed technique is typically implemented by a combination of NIC hardware operations and NIC driver and analytical software running on the CPU. In the present description, the NIC and CPU are both regarded as parts of the host computer, and therefore, references herein to functions performed by the host computer with regard to setting interrupt moderation parameters should be understood as including operations performed by the NIC and/or by the relevant software, as appropriate. All such implementations are considered to be within the scope of the present invention.

In some embodiments of the present invention, a NIC receives incoming data packets from a network on multiple active rings and measures (on its own or with the assistance of software running on the CPU) an average throughput rate of the incoming data packets over the active rings. For each of the active rings, or at least some of the active rings, the host computer measures the respective throughput rate of the incoming data packets on the ring and sets a respective interrupt moderation parameter of the ring by comparing the respective throughput rate on the ring to the average throughput rate. The NIC then issues interrupts to the CPU of the host computer in response to the incoming data packets on each ring at a rate determined in accordance with the respective interrupt moderation parameter.

"Active rings," in the context of the present description and in the claims, are distinguished from "idle rings" for which the packet throughput rate is less than a certain minimal, predefined idle threshold. The interrupt moderation parameter value for the idle rings is set to a predefined idle value, chosen so that the NIC is able to handle bursts of packets, if and when they arrive on the idle ring, without issuing an excessive number of interrupts. For multi-core CPUs, each ring is typically associated with a given core, with one or more rings per core, so that the interrupt moderation parameters for the rings determine the respective rate of interrupts that each core will receive.

In the disclosed embodiments, when the respective throughput rate on a given active ring is less than a certain predefined fraction of the average throughput rate, the computer sets the respective interrupt moderation parameter for the ring to a latency-mode value. In general (although not necessarily), a ring is classified as operating in latency mode if the packet throughput rate on the ring is near the maximum rate of packets that can be transferred over the network in a round-trip latency testing scenario. The host computer typically uses this maximum rate, with some headroom added, as the threshold for considering the traffic to be latency-oriented, rather than idle. Payload sizes may also be considered in identifying latency-mode rings, such that rings with small average payload size typically receive latency-mode values of the interrupt moderation parameter.

On the other hand, when the respective throughput rate on a given ring is greater than the above-mentioned fraction of the average throughput rate, the computer sets the respective interrupt moderation parameter for the ring to a throughput-mode value. In one embodiment, for example, on rings classified as latency-mode rings, the timeout period between interrupts is set to zero, while for throughput-mode rings the timeout period is set to a non-zero value. For throughput-mode rings, a higher timeout value will have minimal effect, since the high throughput will typically saturate the packet count condition before timeout occurs, so that the ring will interrupt frequently, with minimal degradation in latency.

In some embodiments, throughput-mode rings are classified as either mid-range or high-throughput rings, depending on whether the respective throughput rate on the ring is less than or greater than a certain fraction of the average throughput rate, larger that the fraction than that used in distinguishing latency-mode from throughput-mode rings. The mid-range throughput mode is defined so as to include rings that do not "saturate the wire" (i.e., the throughput rate is less than the maximum supported by the link between the NIC and the network), but are too high to meet the criteria of the latency scenario. Interrupt moderation parameters, such as the timeout value, for mid-range rings are tuned so as to consume less CPU capacity than would be required by the latency-mode parameters, but are still within a range that will not starve the traffic stream on the ring due to prolonged intervals between interrupts. The mid-range mode is a compromise to provide flexibility for streams that may burst occasionally or increase throughput, and also for streams that are latency-sensitive but are mainly low in volume.

If none of the above conditions are met on a given ring, the ring is classified as a high-throughput ring, with different interrupt moderation parameters, such as a higher timeout and/or packet count value, from the mid-range ring values. The computer may take various traffic characteristics into account in setting and adjusting the high-throughput parameters, such as the actual bit rate and not only the packet throughput rate, as well as a count of the number of rings that are found to be in high-throughput mode at any given time (such that interrupt moderation is typically applied more aggressively—leading to a longer time between interrupts on any given high-throughput ring—the larger the number of high-throughput rings). Additionally or alternatively, the throughput-mode parameter values may depend on factors such as the maximum packet size (MTU), link speed, and whether the computer is operating in a virtualized environment.

In addition to setting the interrupt moderation parameter values themselves, the computer may set other parameters for each ring depending on the current traffic profile in order to achieve higher throughput and reduce demands on the CPU. For example, the computer may also set ring parameters such as the number and sizes of the buffers in the system memory that are posted by CPU software to receive incoming packets on each ring, and may force reposting of receive buffers when the receive queue reaches a predefined lower limit for posted buffers.

System Description and Methods of Operation

FIG. 1 is a block diagram, which schematically illustrates a computer system 20, in accordance with an embodiment of the invention. System 20 is presented as an example of an operating environment in which the present techniques of interrupt moderation may be applied. The principles of the present invention, however, may similarly be implemented, mutatis mutandis, in other computer systems that receive data packets or other high-speed I/O traffic on multiple channels, and all such implementations are considered to be within the scope of the present invention.

Computer system 20 comprises a CPU 22, which typically (although not necessarily) comprises multiple processing cores 24, and uses a system memory 26, comprising random-access memory (RAM), to store program instructions and data. System 20 is connected to a high-speed packet network 30, such as an InfiniBand or Ethernet switch fabric, by a NIC 28, which communicates with CPU 22 and memory 26 via a peripheral component bus 32, such as a PCI Express bus.

NIC 28 supports concurrent communications on multiple rings 34 between network 30 and processes running on CPU 22. Although for the sake of simplicity, only two rings are shown in FIG. 1, in practice, the number of rings is typically equal at least to the number of cores 24 and may be much larger. Each ring 34 represents a transport channel, which typically comprises a transmit queue (or send queue) 36 for outgoing packets and/or a receive queue 38 for incoming packets, along with a completion queue (CQ) 40. In an InfiniBand environment, for example, queues 36 and 38 are referred to as a work queue pair (QP), whereas Ethernet and other protocols may use other names for these sorts of constructs. Typically, queues 36, 38 and 40 are maintained in system memory 26, where they can be accessed both by CPU 22 and NIC 28, but alternatively, a separate, dedicated memory may be used for this purpose.

Although rings 34 are shown in FIG. 1 as comprising both transmit and receive queues 36, 38, NIC 28 may alternatively serve separate transmit and receive rings, each comprising either a transmit or a receive queue, along with a completion queue. In this case, interrupt moderation may be applied with different parameter values for transmitted packets and for received packets. The description that follows will relate primarily to interrupt moderation with respect to received packets and is applicable regardless of whether rings 34 comprise both transmit and receive queues or only receive queues. The principles of the disclosed embodiments may similarly be applied, mutatis mutandis, to transmit-only rings.

After receiving a message (which comprises one or more incoming packets from network 30) and writing the message data to memory 26, NIC 28 posts a completion report to CQ 40. In general, in the absence of interrupt moderation, NIC 28 will issue an interrupt to an interrupt register 42 in the appropriate core 24 for each completion report that it writes to CQ 40 in each ring 34. In system 20, however, the rate of interrupts is reduced for at least some of the rings by an interrupt moderation function 44. This function sets interrupt moderation parameters for each ring, such as the timeout period between interrupts and/or the packet count required to issue an interrupt. The packet count (or completion count) parameter indicates, for each ring, the threshold number of packets (or completions) that have to be aggregated before an interrupt is issued to CPU 22. The timeout parameter indicates that from the time a packet (or completion) is received, NIC 28 will issue an interrupt when the timeout expires even if the aggregated packet or completion count has not yet reached the threshold. Function 44 may control other traffic-related parameters of rings 34, as well, such as buffer parameters, as mentioned above.

Interrupt moderation function 44 is typically implemented in cooperation between software running on CPU 22 and hardware logic in NIC 28. The software component of function 44 may be integrated with or operate in conjunction with NIC driver software. This software may be downloaded to computer 20 in electronic form, over a network, for example. Additionally or alternatively, the software may be provided to and/or stored in computer system 20 on tangible, non-transitory computer-readable media, such as optical, magnetic, or electronic memory media. Further alternatively, interrupt moderation function 44 may be implemented entirely in hardware logic and/or firmware within NIC 28 or a separate control unit.

Figure 2:
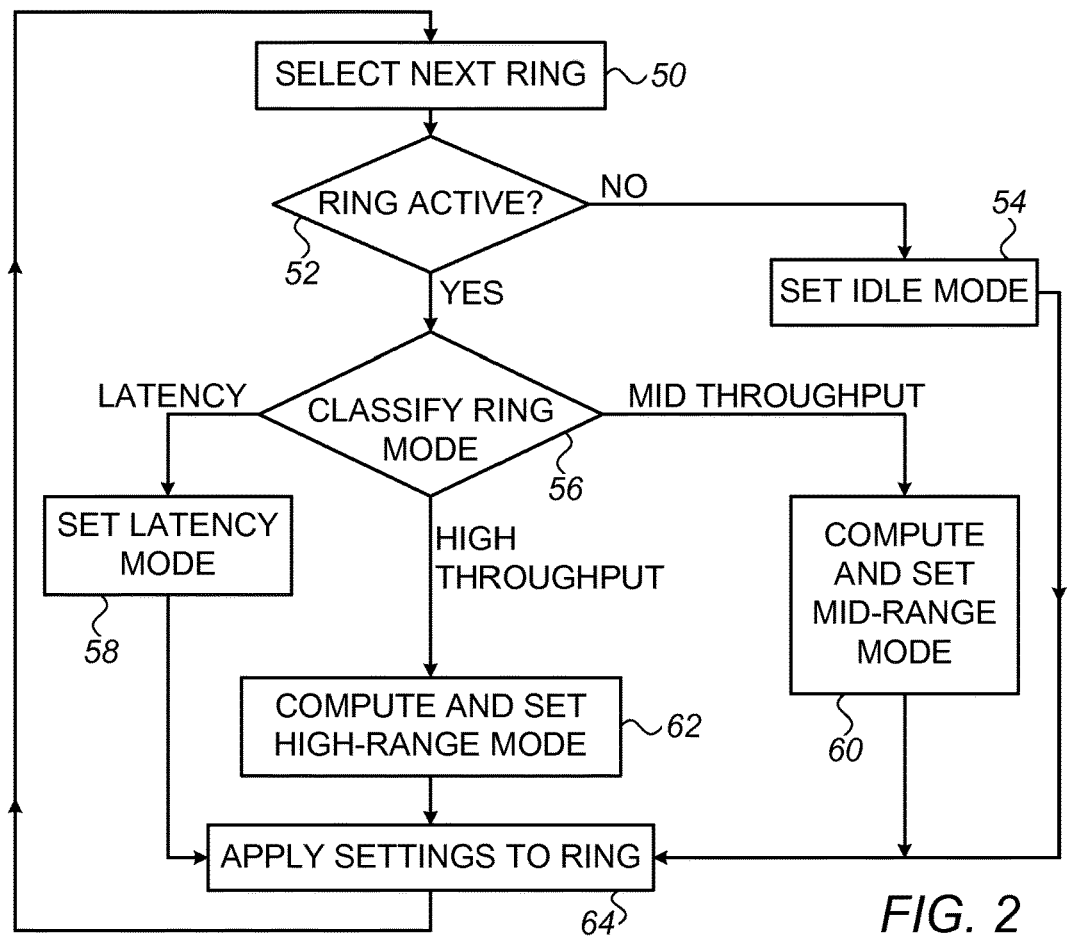
FIG. 2 is a flow chart that schematically illustrates a method for adaptive interrupt moderation, in accordance with an embodiment of the invention.

FIG. 2 is a flow chart that schematically illustrates a method for adaptive interrupt moderation, in accordance with an embodiment of the invention. The method is carried out by interrupt moderation function 44 periodically (for example, every 100 ms) over all of rings 34. Function 44 iterates over the open rings of NIC 28, selecting the next ring to evaluate at a ring selection step 50. It then evaluates whether the ring is active, at an activity checking step 52. The ring is considered to be active, for example, if the rate of incoming packets on the ring is greater than a predefined threshold, such as 2000 packets/sec. If the packet rate on the current ring is less than the threshold, function 44 assigns the ring to the idle mode for purposes of interrupt moderation and sets the interrupt timeout and count values accordingly, at an idle mode setting step 54.

In an example embodiment, the count parameter for purposes of interrupt moderation is set consistently over all of the rings, while the timeout parameter is adjusted according to the ring classification. For instance, the value of the count parameter for each ring may be set to a certain fraction (for example half) of the receive buffer size for the ring. Alternatively, the count parameter may be set based on different criteria for different ring classifications. For rings in idle mode, the timeout parameter is set at step 54 to be a small, non-zero value, such as 10 µs.

For rings that are not idle, function 44 classifies the ring activity mode at a classification step 56. Details of this step are described hereinbelow with reference to FIG. 3. Rings that are not idle but still receive packets at throughput rates substantially below the average are assigned to the latency mode, at a latency assignment step 58. In this mode, the timeout value is typically set to zero in order to maintain the lowest possible latency of packet delivery. Furthermore, if the total throughput over all of the rings is less than a certain fraction, for example, ⅓, of the maximum data rate of the network link over which the packets are received, then all non-idle rings may be assigned to the latency mode (with timeout=0).

Assuming the total throughput is above this level, however, rings whose throughput rates are above the threshold for latency mode, but still less than the threshold for high throughput mode, are classified as mid-throughput rings, at a mid-throughput assignment step 60. The remaining rings, with throughput above the higher threshold, are classified as high-throughput rings, at a high-throughput assignment step 62. In one embodiment, in which NIC 28 serves a 10 Gb Ethernet link, the timeout parameter value of mid-range rings is set to 32 µs, while that for high-throughput rings is set to a non-zero value that depends on the number of rings classified as high-throughput. The value typically increases with the number of high-throughput rings. For example, when there is only a single high-throughput ring, its timeout parameter value is set to 8 µs; with two high-throughput rings, the value is set to 96 µs; with three—256 µs; and with four or more—512 µs.

Interrupt moderation function 44 applies the appropriate parameter values for interrupt moderation on each ring 34, for example by writing the values to corresponding registers in NIC 28, at a parameter setting step 64. As noted earlier, function 44 may also apply the ring classifications in adjusting software-related parameters for each ring, such as buffer sizes in memory 26 and criteria for posting of buffers in receive queues 38.

Figure 3:
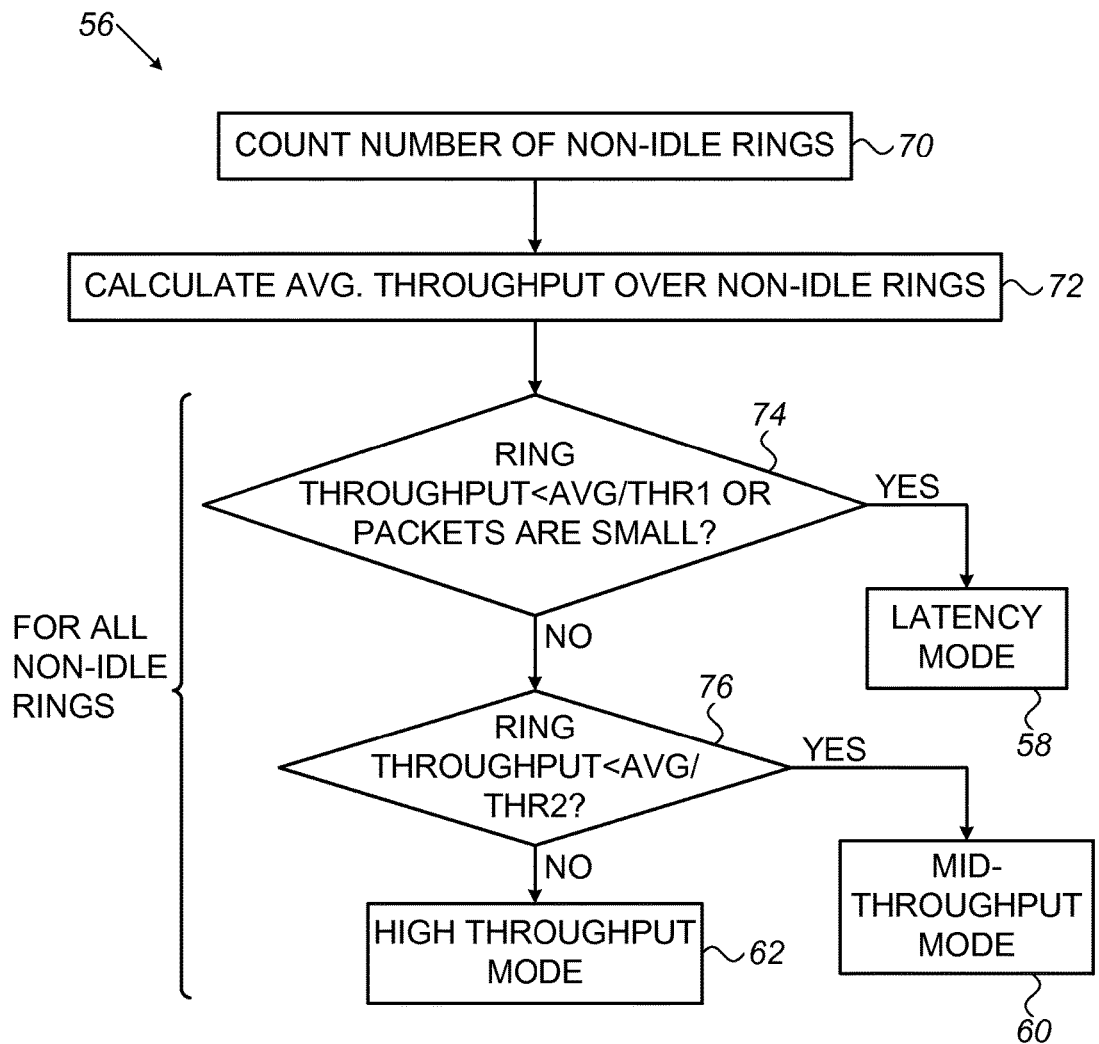
FIG. 3 is a block diagram that schematically illustrates a method for classifying packet transport rings for purposes of adaptive interrupt moderation, in accordance with an embodiment of the invention.

FIG. 3 is a block diagram that schematically shows details of classification step 56, in accordance with an embodiment of the invention. As a preliminary step for this purpose, function 44 counts the number of active (non-idle) rings, at a ring counting step 70. Function 44 uses this number in calculating the average throughput rate of received packets per active ring in NIC 28, at an average assessment step 72. This calculation is based on the total throughput of received packets over all rings, calculated over the last iteration through the method of FIG. 2, divided by the count of active rings that was found at step 70.

The classification of the active rings makes use of two threshold fraction values, THR1 and THR2, which are applied to the average throughput rate found at step 72 in order to set the threshold traffic rates that distinguish between latency, mid-throughput and high-throughput modes. For example, THR1 may be set to the value 5, while THR2 is set to the value 2, although other values may alternatively be used depending on latency goals and other considerations. Function 44 compares the throughput rate measured on each active ring to the fraction of the average throughput rate per ring determined by THR1, at a latency classification step 74. Specifically, if the throughput on the current ring is less than a threshold equal to the average throughput rate divided by THR1 (i.e., one fifth of the average in the present example), the ring is assigned to the latency mode (step 58). Furthermore, if the average packet size on the ring is small, for example, less than 512 bytes, then the ring may also be assigned to the latency mode at step 74 even if the packet throughput is higher than the applicable threshold.

Otherwise, if the throughput rate on the current ring is greater than the threshold applied at step 74, interrupt moderation function 44 compares the throughput rate to a second, higher threshold, at a mid-range classification step 76. This threshold is set to the average throughput rate divided by THR2 (i.e., one half of the average throughput rate in this example). If the throughput rate for the current ring is less than this threshold, the ring is assigned to the mid-range throughput mode (step 60). Otherwise, when the throughput is above this threshold, the ring is assigned to the high-throughput mode (step 62). As explained above, function 44 counts the number of high-throughput rings and may use this number in adjusting the interrupt moderation parameters.

Although the embodiments described above refer specifically to a NIC and interaction between the NIC and a CPU, the principles of the present invention may similarly be applied in other I/O devices that service multiple channels and issue interrupts to the CPU. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communications, comprising:
receiving in a network interface controller (NIC) of a host computer incoming data packets from a network on multiple active rings;
measuring a total average throughput rate of the incoming data packets over the multiple active rings; and
for each ring among a plurality of the multiple active rings:
measuring a respective throughput rate of the incoming data packets on the ring;
setting a respective interrupt moderation parameter of the ring responsively to a comparison of the respective throughput rate on the ring to the total average throughput rate over the multiple active rings; and
issuing interrupts from the NIC to a central processing unit (CPU) of the host computer in response to the incoming data packets on the ring at a rate determined in accordance with the respective interrupt moderation parameter.

2. The method according to claim 1, and comprising identifying one or more idle rings on which the respective throughput rate is less than a predefined idle threshold, and setting the respective interrupt moderation parameter value for the one or more idle rings to a predefined idle value.

3. The method according to claim 1, wherein setting the respective interrupt moderation parameter comprises, when the respective throughput rate on the ring is less than a predefined fraction of the total average throughput rate over the multiple active rings, setting the respective interrupt moderation parameter for the ring to a latency-mode value.

4. The method according to claim 3, wherein setting the respective interrupt moderation parameter comprises, when the respective throughput rate on the ring is greater than the predefined fraction of the total average throughput rate over the multiple active rings, setting the respective interrupt moderation parameter for the ring to a throughput-mode value.

5. The method according to claim 4, wherein setting the respective interrupt moderation parameter for the ring to the latency mode value comprises setting a minimum time between interrupts on the ring to zero, while setting the respective interrupt moderation parameter for the ring to the throughput-mode value comprises setting the minimum time between interrupts to a non-zero value.

6. The method according to claim 4, wherein the predefined fraction is a first fraction, and wherein setting the respective interrupt moderation parameter comprises, when the respective throughput rate on the ring is greater than the first fraction of the total average throughput rate over the multiple active rings but less than a second fraction of the total average throughput rate over the multiple active rings, setting the respective interrupt moderation parameter for the ring to a mid-range throughput value, and when the respective throughput rate on the ring is greater than the second fraction of the total average throughput rate over the multiple active rings, setting the respective interrupt moderation parameter for the ring to a high-throughput value, which is different from the mid-range throughput value.

7. The method according to claim 4, wherein setting the respective interrupt moderation parameter for the ring to the throughput-mode value comprises counting a number of the rings for which the respective throughput rate on the ring is greater than the predefined fraction of the total average throughput rate over the multiple active rings, and adjusting the throughput-mode value of the interrupt moderation parameter responsively to the number.

8. The method according to claim 1, wherein the rings are associated with different, respective cores of the CPU, and wherein setting the respective interrupt moderation parameter comprises setting different, respective values of the interrupt moderation parameter for the cores, depending upon the rings with which the cores are respectively associated.

9. Apparatus for communications, comprising:
a central processing unit (CPU);
a system memory; and
a network interface controller (NIC), which is configured to receive incoming data packets from a network on multiple active rings and to issue interrupts to the CPU in response to the incoming data packets at a rate determined, for each ring, in accordance with a respective interrupt moderation parameter that is set for the ring,
wherein the CPU is configured to measure an average throughput rate of the incoming data packets over the multiple active rings, as a function of the total throughput of all the rings divided by a count of the multiple active rings, and, for each ring among a plurality of the multiple active rings, to measure a respective throughput rate of the incoming data packets on the ring, and to set the respective interrupt moderation parameter of the ring responsively to a comparison of the respective throughput rate on the ring to the average throughput rate over the multiple active rings.

10. The apparatus according to claim 9, wherein the CPU is configured to identify one or more idle rings on which the respective throughput rate is less than a predefined idle threshold, and to set the respective interrupt moderation parameter value for the one or more idle rings to a predefined idle value.

11. The apparatus according to claim 9, wherein when the respective throughput rate on the ring is less than a predefined fraction of the average throughput rate over the multiple active rings, the respective interrupt moderation parameter for the ring is set to a latency-mode value.

12. The apparatus according to claim 11, wherein when the respective throughput rate on the ring is greater than the predefined fraction of the average throughput rate over the multiple active rings, the respective interrupt moderation parameter for the ring is set to a throughput-mode value.

13. The apparatus according to claim 12, wherein the interrupt moderation parameter comprises a minimum time between interrupts on the ring, and the latency-mode value of the minimum time between interrupts is set to zero, while the throughput-mode value of the minimum time between interrupts is set to a non-zero value.

14. The apparatus according to claim 12, wherein the predefined fraction is a first fraction, and wherein when the respective throughput rate on the ring is greater than the first fraction of the average throughput rate over the multiple active rings but less than a second fraction of the average throughput rate over the multiple active rings, the respective interrupt moderation parameter for the ring is set to a mid-range throughput value, and when the respective throughput rate on the ring is greater than the second fraction of the average throughput rate over the multiple active rings, the respective interrupt moderation parameter for the ring is set to a high-throughput value, which is different from the mid-range throughput value.

15. The apparatus according to claim 12, wherein the CPU is configured to count a number of the rings for which the respective throughput rate on the ring is greater than the predefined fraction of the average throughput rate over the multiple active rings, and to adjust the throughput-mode value of the interrupt moderation parameter responsively to the number.

16. The apparatus according to claim 9, wherein the rings are associated with different, respective cores of the CPU, and wherein the CPU is configured to set different, respective values of the interrupt moderation parameter for the cores, depending upon the rings with which the cores are respectively associated.

17. A computer software product, comprising a non-transitory computer-readable medium in which program instructions are stored, which instructions, when read by a computer that includes a CPU and a network interface controller (NIC), which is configured to receive incoming data packets from a network on multiple active rings and to issue interrupts to the CPU in response to the incoming data packets at a rate determined, for each ring, in accordance with a respective interrupt moderation parameter that is set for the ring, cause the computer to measure a collective average throughput rate of the incoming data packets over the multiple active rings and, for each ring among a plurality of the multiple active rings, to measure a respective throughput rate of the incoming data packets on the ring, and to set the respective interrupt moderation parameter of the ring responsively to a comparison of the respective throughput rate on the ring to the collective average throughput rate over the multiple active rings.

* * * * *